J. H. PIFER.
FOUR WHEEL DRIVE TRUCK.
APPLICATION FILED JAN. 28, 1918.
1,314,093.
Patented Aug. 26, 1919.
2 SHEETS—SHEET 2.
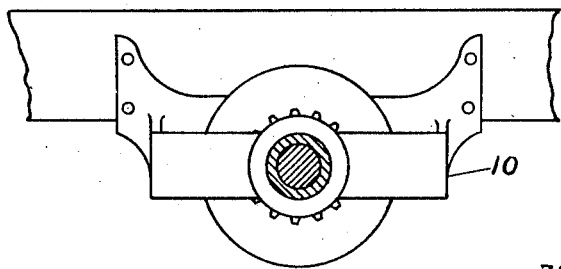
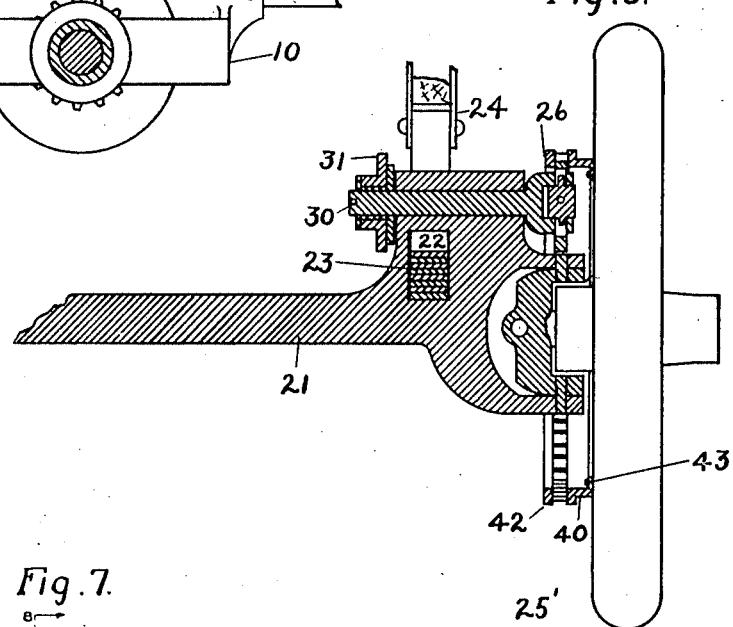
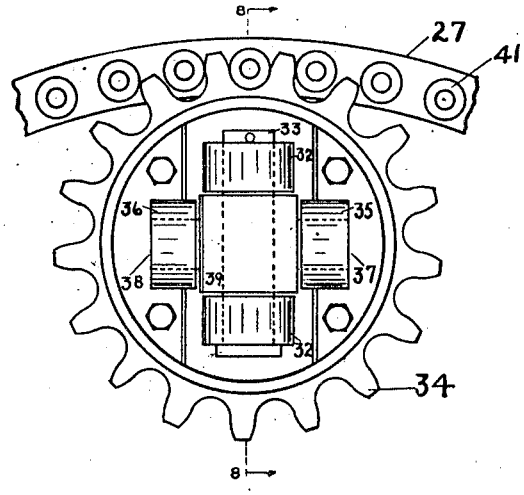
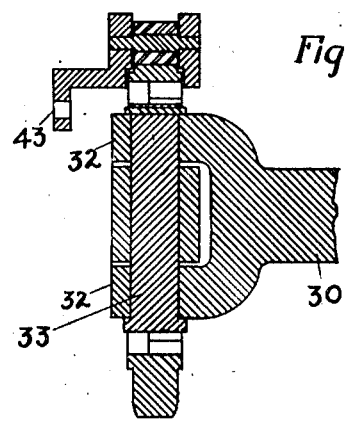
Inventor
John H. Pifer
by C. H. Enochs
Attorney

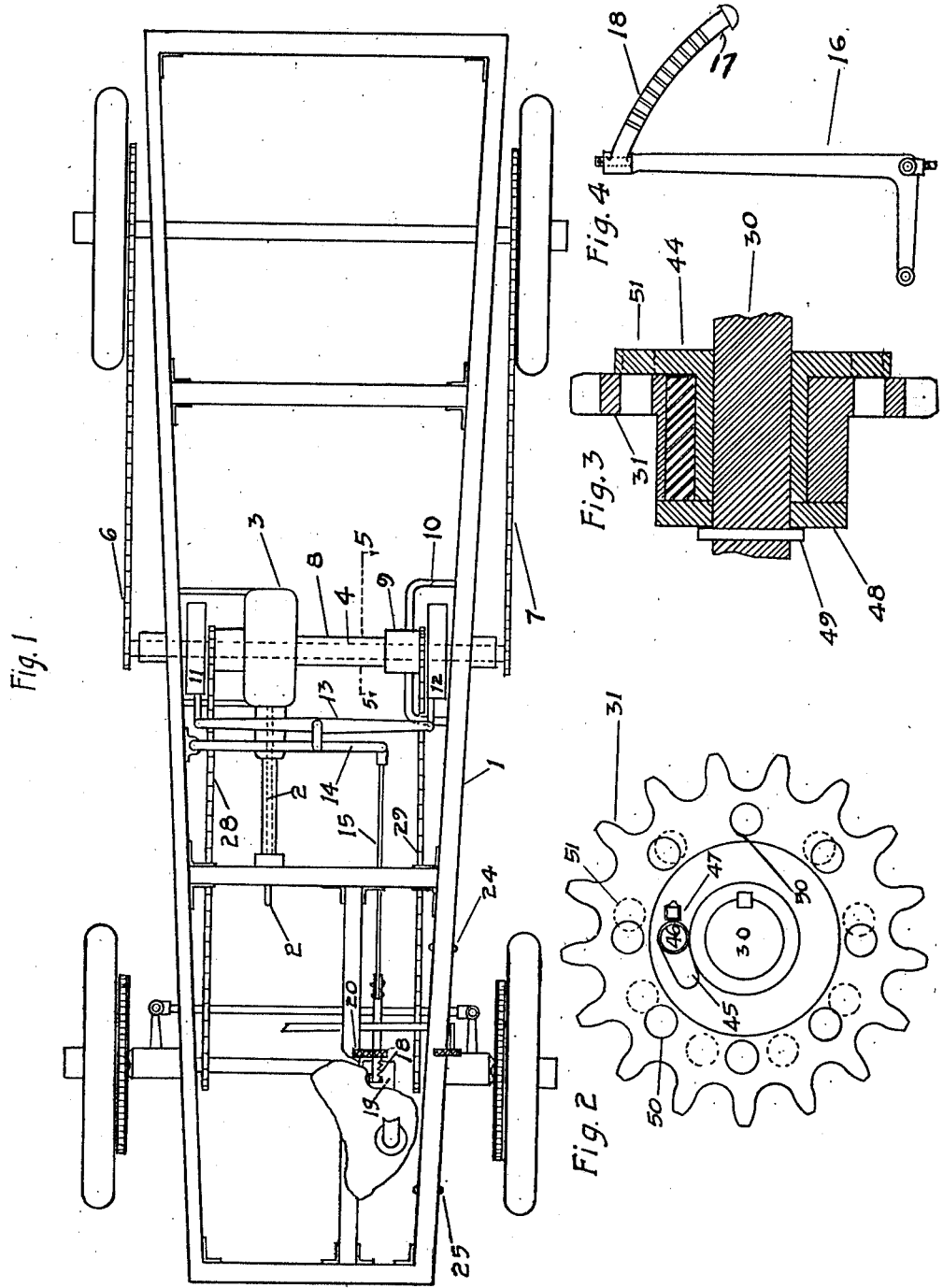

UNITED STATES PATENT OFFICE.

JOHN H. PIFER, OF LARIMORE, NORTH DAKOTA.

FOUR-WHEEL-DRIVE TRUCK.

1,314,093.     Specification of Letters Patent.     Patented Aug. 26, 1919.

Application filed January 28, 1918. Serial No. 214,224.

*To all whom it may concern:*

Be it known that I, JOHN H. PIFER, a citizen of the United States, and a resident of Larimore, in the county of Grand Forks and State of North Dakota, have invented certain new and useful Improvements in Four-Wheel-Drive Trucks, of which the following is a specification.

One object of my invention is to provide an improved form of brake mechanism.

Another object of my invention is to provide an improved roller gear and sprocket transmission and a universal joint for transmitting power to the front wheels.

Another object of my invention is to provide an improved front spring mounting to equalize the pressure transmitted through the front wheels.

Another object of my invention is to provide a special style of jack shaft and journal mounting to offset binding strains in the frame.

Another object of my invention is to provide improved means for driving the front wheels and, at the same time, preventing slippage of the wheels on turning corners.

With these and incidental objects in view the invention consists of certain novel features of construction and combination of parts, the essential elements of which are hereinafter described with reference to the drawings which accompany and form a part of this specification.

In the drawing Figure 1 is a plan view of the chassis of a truck embodying my invention. Fig. 2 is an enlarged detail of one of the front wheel sprockets. Fig. 3 is a section taken on the line 3—3, Fig. 2. Fig. 4 is a detail of the foot brake lever. Fig. 5 is a section taken on the line 5—5, Fig. 1. Fig. 6 is a sectional view of the front axle showing the universal joint. Fig. 7 is an enlarged detail of the universal joint and pinion shown in Fig. 6, and Fig. 8 is a section taken on the line 8—8, Fig. 7.

The frame 1 of the chassis shown in Fig. 1 is adapted to carry thereon a prime mover of some sort driving a propeller shaft 2 and, through differential gearing in the housing 3, the jack shafts 4 and 5, from which is transmitted, through sprocket and chain mechanism 6 and 7, the power for propelling the rear wheels of the truck.

A housing 8, carried by and extended from the differential housing 3, is journaled at 9 in the spider 10, better shown in Fig. 5, this spider being supported by the side frame member.

This journal mounting between the jack shaft and the frame allows a twisting between the sides of the frame and housings carrying the jack shaft mechanism without throwing any twisting strains upon the jack shaft and differential gearing housing.

Brakes 11 and 12, actuated through link mechanisms 13, 14, brake rod 15, and bell crank lever 16, Fig. 4, operate in a manner well known to those skilled in the art, but the foot lever 17 of the bell crank 16 has an action different from the ordinary brake.

The ratchet teeth 18 are adapted to engage with floor plate 19 when the foot lever is pressed to the left by the operator, but as the foot pedal 20 is set to the right of the quadrant shaped lever 17 the normal tendency is for the ratchet teeth to be held out of engagement with the floor plate 19 and, in order to engage the teeth with the floor plate, it is necessary for the driver to consciously press his foot to the left as he sets the brake; also, to release the brake, it is only necessary to push straight downwardly on the lever and then allow it to free itself, as the natural movement of the foot pedal 20 will be to swing the ratchet teeth out of engagement with the floor plate.

The front axle 21, Fig. 6, has an aperture 22 provided therein, through which passes the leaf spring 23 hinged to the frame at its rear end at 24 and slidably mounted to the frame at its front end at 25, Fig. 1.

With this construction it is evident the forward weight of the truck is carried on the axle 21 where the spring 22 passes therethrough, and as the drive of the front wheel will be at the ground surface 25' while the drive of the engine will be at the pitch line 26 of the roller gear 27, Figs. 6 and 7, it is evident that the point of support is thus interposed between the point of reaction on the ground and the point of drive of the applied power.

Referring to Fig. 1, it will be seen that suitable sprocket and chain mechanisms 28 and 29 deliver power through the differential to the front wheel driving shafts, one of which is better shown at 30, Fig. 6, the driving sprocket pinion 31 being suitably fastened thereto.

This driving shaft 30, Fig. 8, has journaled in its forked ends 32 the pin 33.

The pinion 34 has bolted to corner lugs positioned in the plane of the teeth, journal caps 35 and 36, respectively, in which are journaled a pair of trunnion shafts 37 and 38, respectively, these shafts forming a part of, and extending from, the body 39 through which the pin 33 passes.

It is evident that this construction provides a universal joint, the center of whose action is always in line with the teeth of the pinion 34.

The pinion 34 drives the roller gear 27 which is preferably formed of a spider 40 carrying thereon suitably mounted rollers 41, capped by the ring 42, the perimeters of the ring 42 and the spider 40 serving as a guide to maintain the pinion 34 in proper alinement with the rollers 41.

The spider 40 is bolted to the wheel spokes at 43.

It is evident that this construction insures the alinement of the steering axis of the front wheel with the application of power thereto, and also provides the application of the weight of the truck on the front wheel intermediate of the ground and the point of application of power.

Were no provision made to correct the defect, it is evident that, on turning, the front wheels would have to slip as they would be traveling at a different rate of speed than the rear wheels, as they are driven from the same jack shaft at each side of the truck.

I have therefore provided a roller ratchet in the sprocket 31, best shown in Figs. 2 and 3.

The shaft 30 has keyed to it the flanged sleeve 44 on which is journaled the sprocket wheel proper 31.

The channel 45 is formed in the flanged sleeve 44 and carries therein a roller 46, and a flat curved spring 47 serves to hold the roller 46 in engagement with the surface of the channel 45 and the sleeve 44 under straight ahead working conditions.

It is evident that if the particular front wheel being considered, should start or tend to run faster than it is being driven by the sprocket 31, Fig. 2, the shaft 30 will turn in a clockwise direction with respect to the sprocket 31, the roller 46 will, by slight compression of the spring 47, be relieved of its locking pressure with the sleeve 44, and the sleeve 44 will turn in the sprocket wheel bearing.

The flange of the sleeve 44 on the one end and a plate 48 on the other end serve to keep the roller 46 in position, the cotter pin 49 being provided to maintain the proper position of the plate 48 with the sleeve 44.

A series of apertures 50 in the sprocket 31, with a second series of apertures 51, provide means for locking the sprocket and flange sleeve together when desired, and the spacing of the two sets of holes is offset, as shown in Fig. 2, so as to be able to more readily find a pair of apertures in line at any time and pass a pin therethrough and so lock the front drive mechanism for emergency use when pulling out of holes and the like, thus taking advantage of the traction of all four wheels without the possibility of any slippage in the driving mechanism of any of the wheels, this being especially important in backing under heavy load conditions.

While I have described my invention and illustrated it in one particular design, I do not wish it understood that I limit myself to this construction, as it is evident that the invention may be varied in many ways within the scope of the following claims.

Claims:

1. In a truck the combination of a frame, a differential gear housing, a jack shaft housing extending from each side of said differential gear housing, a jack shaft carried by each of said jack shaft housings, two sprockets carried by each of said jack shafts, mechanism actuated by a sprocket on one of said jack shafts for driving a front wheel; mechanism actuated by the other of the sprockets on the same jack shaft for driving a rear wheel, and a journaled mounting for one of said jack shaft housings positioned between the inner of said sprockets and said differential gear housing, said journaled mounting being carried by a frame member.

2. In a four wheel drive truck the combination with a steerable front wheel, a one piece axle, a head positioned at each end of said axle, a forked extension from said head carrying therein a vertical spindle, a wheel spindle supporting said wheel journaled on said vertical spindle, a gear carried by said wheel and concentric therewith, a horizontal driving shaft journaled in said head, a pinion carried on said driving shaft with a universal joint and co-acting with said gear, said head having an aperture therein below said horizontal shaft for carrying therein a spring for supporting the body of said vehicle.

3. In a four wheel drive truck the combination of a propeller shaft, differential mechanism for driving a pair of jack shafts, a rear wheel, driving means connecting one of said jack shafts with said rear wheel, a front wheel, driving means connecting said jack shaft with said front wheel including, in combination, a counter-shaft, a sleeve positively driven by said counter-shaft and having a flange thereon with a series of apertures in said flange, a pinion journaled on said sleeve and driven by said sleeve forwardly through a roller ratchet, said pinion having a series of apertures therein positioned in the same circle as the apertures in said flange but spaced different than the apertures in said flange whereby one aperture in said flange and one aperture in said pinion is always substantially in line so a pin may be passed therethrough to lock said pinion and said sleeve together to drive said pinion backwardly, and a gear carried by said forward wheel and co-acting with said pinion.

JOHN H. PIFER.